Aug. 30, 1932.  F. J. NORTON  1,874,339
ANALYTICAL METHOD AND APPARATUS THEREFOR
Filed May 22, 1929

Francis J. Norton
INVENTOR
BY Forbes Silsby
ATTORNEY

Patented Aug. 30, 1932

1,874,339

UNITED STATES PATENT OFFICE

FRANCIS J. NORTON, OF SYRACUSE, NEW YORK, ASSIGNOR TO THE SOLVAY PROCESS COMPANY, OF SYRACUSE, NEW YORK, A CORPORATION OF NEW YORK

ANALYTICAL METHOD AND APPARATUS THEREFOR

Application filed May 22, 1929. Serial No. 365,074.

This invention relates to an analytical process and apparatus, and in particular to a process and apparatus for testing hypochlorite bleach solutions.

Solutions of hypochlorite, such as sodium hypochlorite or calcium hypochlorite, find extensive use in bleaching and oxidizing processes such as the bleaching of paper pulp and the treatment of oils to remove sulphur constituents. Successful use of these hypochlorite liquors is largely dependent upon accurate technical control of the processes and knowledge of the strengths of the liquors used whereby the quantity of chlorine, which is the active constituent of the bleach liquor, may be readily determined and controlled. Numerous methods have heretofore been employed for determining the available chlorine in hypochlorite liquors, but such methods have required the maintenance of laboratory facilities and technical skill in their manipulation, which is beyond the ability of many individuals who, in plant operations, are responsible for the control of the bleaching operations. Apparatus which may be readily transported from place to place in the plant has been proposed, but heretofore such apparatus has been made up of relatively fragile parts, and like the laboratory methods, have required a considerable degree of skill in their manipulation in order to obtain reliable and accurate results.

It is an object of this invention to provide a simple, rugged, portable apparatus for the testing of solid or liquid materials which will react with a solid or liquid reagent to liberate a quantity of gas, the amount of which is proportional to the quantity of the constituent of the material which is to be determined. It is a further object of this invention to provide a method and apparatus, the manipulation of which is simple, so that trustworthy results may be obtained by persons unskilled in general analytical work.

Figure 1:
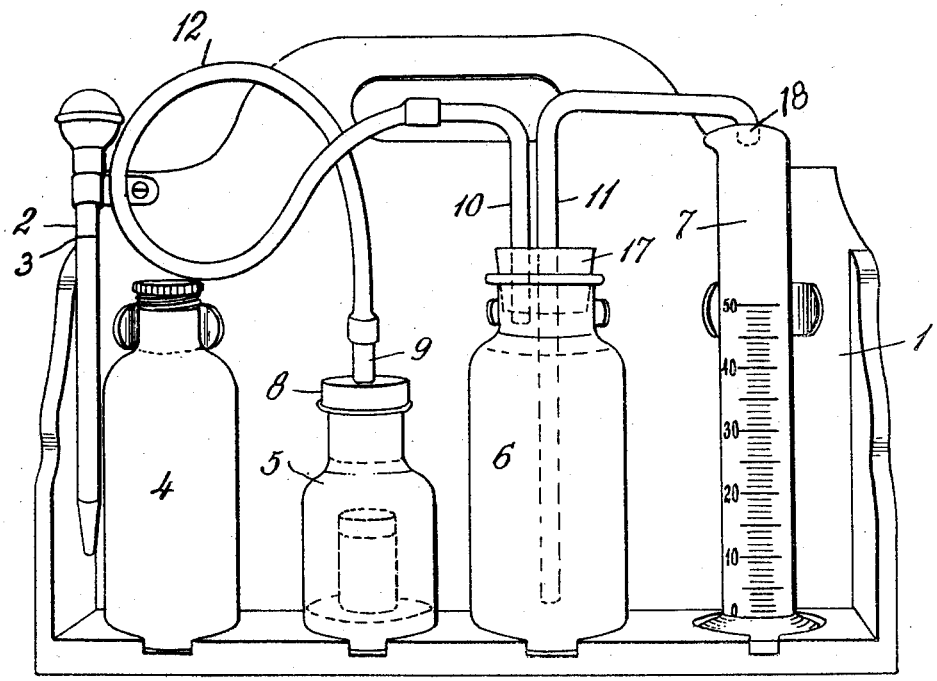

The accompanying drawing shows one example of my apparatus particularly designed for the testing of bleach liquors. Fig. 1 is a view of the assembled apparatus and Fig. 2 is a cross section of decomposition vessel 5 of Fig. 1.

In the drawing, 1 represents a portable rack on which the apparatus is removably mounted and whereby it may be readily carried to any place where it is desired to make the analysis. Securely mounted to this rack but removable therefrom is a pipette tube 2 which is standardized to deliver 2.75 cc. of liquid when filled to a mark 3. The box also has provisions for holding a bottle of hydrogen peroxide 4, a closed decomposition vessel or flask 5, a closed displacement vessel containing water 6, and a graduate 7 having a capacity of 50 cc. which is calibrated to deliver that quantity of liquid when filled to the corresponding mark. Decomposition vessel 5 is provided with a tight-fitting rubber stopper 8 through which a tube 9 passes. Displacement vessel 6 is provided with a closefitting rubber stopper 17 through which passes tube 10, which terminates in the upper part of the vessel above the water level therein and tube 11 which terminates near the bottom of vessel 6. Tube 11 is bent at right angles at its upper portion and has a vertical outlet portion 18 arranged to discharge liquid passing therethrough into graduate 7. To provide accuracy and ease of operation, I have found that tube 11 should preferably have a bore of such size that the capillary force in this tube or the cohesion between the water and the inner glass surface of the tube is of sufficient magnitude to prevent a break of the liquid column and to permit of touching or wiping off from the tip any protruding portion of the water column without in any way destroying or disturbing the permanency of the continuous liquid column which entirely fills tube 11. A tube having a bore of the described size is referred to as a "capillary tube." Tubes 9 and 10 are connected with each other by means of a flexible rubber tube 12 of sufficient length to permit decomposition vessel 5 to be removed from the box 1 and manipulated without disturbing container 6.

Figure 2:
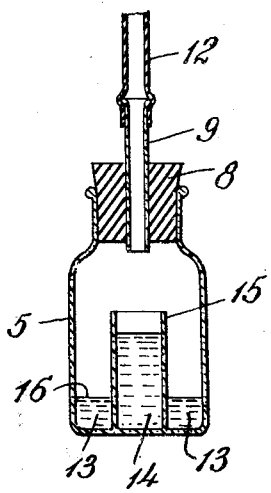

The interior arrangement of decomposition vessel 5 is shown in detail in Fig. 2. Within decomposition vessel 5 are two chambers 13 and 14 separated by partition 15. Chamber 13 is of such size that when filled to the level indicated at 16 which may be fixed by a mark on the wall of vessel 5, it contains about 10 cc. of liquid. Chamber 14 is of such size that it will contain 2.75 cc. of liquid without danger of any of the liquid inadvertently being spilled from chamber 14 into chamber 13.

The apparatus described above is employed as follows in analyzing a hypochlorite liquor:

The strength of hypochlorite bleach liquors is commonly expressed in terms of grams of available chlorine per liter of solution. The method of analysis in the case of sodium hypochlorite is based on the reaction I  $NaOCl + H_2O_2 = NaCl + H_2O + O_2$ or, in the case of calcium hypochlorite II  $Ca(OCl)_2 + 2H_2O_2 = CaCl_2 + 2H_2O + 2O_2$ Displacement vessel 6 is very nearly filled with water at room temperature and the stopper 17 inserted in the mouth of the container. The water level in this container should be slightly below the termination therein of tube 10. A fresh hydrogen peroxide solution containing about 3% hydrogen peroxide at room temperature is carefully poured into compartment 13 of decomposition vessel 5 up to the mark on the wall of the vessel. Care should be taken that no hydrogen peroxide solution gets into compartment 14. A 2.75 cc. sample of the bleach liquor is measured out by means of pipette 2 and placed in compartment 14 of the decomposition vessel. The neck of decomposition vessel 5 is of such size that when stopper 8 is tightly inserted therein it will decrease the volumetric capacity of the vessel by an amount greater than the unsubmerged volume of tube 11 and thus cause a portion of the water in vessel 6 to flow into and fill tube 11 and into graduate 7. This water is thrown away and graduate 7 replaced under the outlet of tube 11. Instead of filling tube 11 with water by pushing stopper 8 into the neck of vessel 5, it is evident that, with vessel 5 closed, tube 11 may be filled by pushing stopper 17 into the neck of vessel 6 to decrease the volumetric capacity of that vessel.

The entire apparatus and the contents of vessels 5 and 6 should be at room temperature, i. e., at a temperature between about 20° C. and about 30° C. Tube 11 should be completely filled to its outlet by water displaced from vessel 6 at the time stopper 8 was inserted in the neck of vessel 5.

The contents of chambers 13 and 14 of decomposition vessel 5 are mixed by lightly grasping vessel 5 by the neck and tipping so as to successively allow small portions of the bleach liquor in chamber 14 to mix with the hydrogen peroxide in chamber 13, accompanied by gentle shaking to intimately mix each successessive portion. When the two liquids have been completely mixed, the vessel 5 is given a few vigorous shakes.

As indicated by Equations I and II, an amount of oxygen gas proportionate to the amount of available chlorine in the bleach liquid is evolved by reaction of the hypochlorite and the hydrogen peroxide. The evolved gas displaces air which was in vessel 5 and tubes 9, 10 and 12, and displaces an equivalent quantity of water from displacement vessel 6 and tube 11 which is caught in graduate 7. The number of cc. of water thus displaced into graduate 7 is read and gives directly the grams of available chlorine per liter of hypochlorite solution which was decomposed in vessel 5. For example, if 15 cc. of water were thus displaced into graduate 7, the hypochlorite solution contained 15 grams of available chlorine per liter of solution.

The method of employing the apparatus described is available for the analysis of bleach liquors containing from about 5 to 50 grams of available chlorine per liter. This range may be increased up to for example 250 grams of available chlorine per liter by using a larger graduate cylinder or by using a smaller pipette, say one which is graduated to deliver 0.55 cc., in which case the reading of the volume of water displaced into the cylinder must be multiplied by the factor 5 in order to give the grams of available chlorine per liter of solution analyzed.

The volume of hypochlorite liquor to be used as a sample in this analysis, in order for each cc. of water displaced to correspond to one gram of available chlorine per liter of the solution tested, may readily be determined by stoichiometric calculations based upon the equations noted above. It will be desirable ordinarily to compensate for certain factors in the method of analysis which otherwise might introduce errors into the result. For instance, theoretically, when the oxygen gas evolved is at a temperature of 25° C. and a pressure of 760 mm., this sample in the above method should be 2.92 cc. and the actual sample size of 2.75 given above is made lower than theory would call for because the reaction which occurs when the bleach liquor and hydrogen peroxide are mixed generates heat which causes the gas in vessel 5 to increase in temperature and displace more water into the graduated cylinder than it otherwise would. This change in temperature is compensated for by decreasing the volume of the sample. Furthermore, it is apparent that if the apparatus is employed at a higher or a lower temperature than 25° C., some error will be introduced into the analysis, but it has been found in practice that for variations in temperature of the apparatus over a range of 5° C. above or below the temperature for which the apparatus is calibrated, these errors are not sufficiently large to warrant applying corrections for the same. It is apparent, of course, that if it is desired to employ the apparatus at a different temperature range than that for which the specific method described above is designed, for example, if it is to be operated at temperatures of about 10° C., pipette 2 should be calibrated for use at such a temperature.

It is apparent to anyone skilled in the art, that numerous changes and modifications in the apparatus and process described may be made. For example, if it is not desired that the number of cc. of water displaced into cylinder 7 correspond to the number of grams of available chlorine per liter in the solution analyzed, it is unnecessary that the stated 2.75 cc. of solution be used as a sample, but in such cases a sample of any desired size may be employed and the proper factor for translating the volume of displaced water into grams of chlorine per liter calculated and applied. The method and apparatus of this invention are applicable for the analysis of any substance from which a gas is evolved by reaction with another liquid or solid and in which reaction the amount of gas evolved is proportional to that constituent of the substance which is to be determined. Pipette 2 may be replaced by any other known measuring device and chambers 13 and 14 and decomposition vessel 5 may be used in the opposite way in which its operation has been described above. For example, if a solid were being analyzed, it would be preferable to weigh out a sample of the solid into chamber 13 and to place the reacting fluid in chamber 14. In all cases the liquid which is displaced by the evolution of gas must be inert towards the gas produced, i. e., a liquid which does not react with or absorb the gas which is produced. For example, in the analysis of bleach liquors described above, the water employed should be already saturated with oxygen at the temperature at which it is used, as by standing in the air, so that oxygen which is evolved by the reaction of the hypochlorite with the hydrogen peroxide, and which may pass into container 6, is not absorbed in an amount such that error would be introduced into the analysis.

I claim:

1. In an analytical process in which a quantity of gas is evolved from a material, which quantity of gas is proportionate to the amount of the constituent of such material to be determined, that improvement which comprises displacing by said evolved gas a portion of inert liquid having the same volume as said gas maintaining the pressure upon said evolved gas substantially constant during the displacement of said liquid, and directly measuring the quantity of said displaced liquid.

2. In an analytical process in which a gas is evolved from a solution to be analyzed by reaction therewith of a second solution, and in which the quantity of said gas is proportional to the amount of a constituent of said solution to be analyzed, that improvement which comprises reacting a known amount of said solution to be analyzed with said second solution to evolve the gas, displacing by said evolved gas a portion of a body of inert liquid having the same volume as said gas maintaining the pressure upon said evolved gas substantially constant during the displacement of said liquid and directly measuring the volume of said displaced liquid.

3. An apparatus for the rapid analysis of materials comprising a closed vessel provided with two chambers each adapted to retain a quantity of substance therein out of direct contact with the substance in the other chamber, but constructed to permit said substances to be brought into direct contact with each other without opening said vessel, a conduit for gas leading from said vessel to a second closed vessel, said second vessel having a quantity of inert liquid therein and having an inlet for said conduit above the surface level of said inert liquid, a second conduit extending from below the surface level of said inert liquid to a point above the surface level of said liquid, and a graduated receptacle arranged to receive overflow liquid passing through said conduit.

4. An apparatus for analytical processes in which a quantity of gas is evolved from the material, which quantity of gas is proportionate to the amount of the constituent of said material to be determined, which comprises in combination a closed decomposition vessel, a closed displacement vessel containing an inert liquid, a gas conduit communicating with the interiors of the decomposition vessel and of the displacement vessel, a liquid measuring means for directly measuring a volume of a body of liquid, a liquid conduit having its inlet end positioned below the surface of the liquid in the displacement vessel and its outlet end positioned to vent into said liquid measuring means, and means for decreasing the volumetric capacity of one of the aforesaid vessels whereby liquid is forced from the displacement vessel into said liquid conduit to completely fill it.

5. An apparatus for analytical processes in which a quantity of gas is evolved from the material, which quantity of gas is proportionate to the amount of the constituent of said material to be determined, which comprises in combination a closed decomposition vessel, a closed displacement vessel containing an inert liquid, a gas conduit communicating with the interiors of the decomposition vessel and of the displacement vessel, liquid measuring means for directly measuring the volume of a body of liquid, a liquid conduit having its inlet end positioned below the surface of the liquid in the displacement vessel and its outlet end positioned to vent into said liquid measuring means, and having a predetermined unsubmerged volume, and means for decreasing the volumetric capacity of said decomposition vessel by an amount greater than the unsubmerged volume of said liquid conduit.

6. An apparatus for analytical processes in which a quantity of gas is evolved from the material, which quantity of gas is proportionate to the amount of the constituent of said material to be determined, which comprises in combination a closed decomposition vessel, a closed displacement vessel containing an inert liquid, a gas conduit communicating with the interiors of the decomposition vessel and of the displacement vessel, liquid measuring means for directly measuring the volume of a body of liquid, a capillary tube having an inlet end positioned below the surface of the liquid in the displacement vessel and a vertical outlet portion positioned to vent into said liquid measuring means, and having a predetermined unsubmerged volume, and means for decreasing the volumetric capacity of said decomposition vessel by an amount greater than the unsubmerged volume of said liquid conduit.

7. In an analytical process in which a quantity of gas is evolved from a material, which quantity of gas is proportionate to the amount of the constituents of such material to be determined, that improvement which comprises displacing by said evolved gas a portion of inert liquid having the same volume as said gas, maintaining the pressure upon said evolved gas substantially constant during the displacement of said liquid, separating the liquid thus displaced from the body of residual undisplaced liquid, and directly measuring the volume of said separated liquid.

FRANCIS J. NORTON.